United States Patent
Tomikura et al.

(10) Patent No.: US 7,817,517 B2
(45) Date of Patent: Oct. 19, 2010

(54) DISC RECORDING AND REPRODUCING DEVICE AND DISC RECORDING AND REPRODUCING METHOD

(75) Inventors: Yoshihiro Tomikura, Osaka (JP); Junji Soga, Kyoto (JP)

(73) Assignee: Panasonic Corporation, Osaka (JP)

( * ) Notice: Subject to any disclaimer, the term of this patent is extended or adjusted under 35 U.S.C. 154(b) by 378 days.

(21) Appl. No.: 11/930,531

(22) Filed: Oct. 31, 2007

(65) Prior Publication Data
US 2008/0106992 A1 May 8, 2008

(30) Foreign Application Priority Data
Nov. 7, 2006 (JP) .............................. 2006-301160

(51) Int. Cl.
*G11B 5/09* (2006.01)
(52) U.S. Cl. ................. 369/53.21; 369/53.2; 369/47.12; 369/84
(58) Field of Classification Search ........................ None
See application file for complete search history.

(56) References Cited
U.S. PATENT DOCUMENTS
7,676,401 B2 * 3/2010 Sawada et al. ................. 705/26

2005/0249078 A1 * 11/2005 Hwang et al. ............ 369/53.21
2006/0280109 A1 * 12/2006 Narumi et al. ........... 369/275.3

FOREIGN PATENT DOCUMENTS
JP   2003-272292   9/2003

* cited by examiner

Primary Examiner—Muhammad N. Edun
(74) Attorney, Agent, or Firm—Pearne & Gordon LLP

(57) ABSTRACT

A disc recording and reproducing device and method record video data using a new file system other existing device cannot recognize. However, when a disc thus recorded is loaded in the existing device, the user is prevented from being instructed to format the disc (initialize the file system) or inadvertently erasing data thereon. The disc recording and reproducing device comprises the following elements. A first write-enable state setting unit checks a write inhibit flag when a disc is loaded, and sets the flag on the disc to a write-enable state when the flag is in a write-protect state. A first write-protect state setting unit checks information in a record history information storage when the disc is unloaded, and sets the flag on the disc to the write-protect state when data is recorded thereon or the flag in the memory is in the write-protect state and no data is recorded.

9 Claims, 4 Drawing Sheets

DISC RECORDING AND REPRODUCING DEVICE AND DISC RECORDING AND REPRODUCING METHOD

FIELD OF THE INVENTION

The present invention relates to a disc recording and reproducing device and a disc recording and reproducing method that record and reproduce video, audio, and information data onto and from a detachable disc recording media.

BACKGROUND OF THE INVENTION

In the use of an audiovisual (AV) product, it has conventionally been necessary for the user to recognize which file system the device uses to record data, and to determine to use other device supporting the file system.

As an example of a means of protecting a disc, i.e. a recording media, the user manually sets a mechanical protection provided in the disc case. When a device recognizes a write-protect state of the mechanical protection, the device performs no recording to protect the video data or the like thereon.

In another example of such a technique, write control information is written on a recording media. The write control information indicates either a write-protect state to inhibit writing data on the recording media or a write-enable state to permit writing data thereon. Thus, the control of writing data on the recording media according to the write control information prevents inadvertent writing and erasing of data on the recording media. Such a technique is disclosed in Japanese Patent Unexamined Publication No. 2003-272292.

The above means and technique have the following problems. For example, a device uses the same disc used by another existing device, and records video data on the disc using a new file system which the other existing device cannot recognize. In such a case, when a user attempts to use the recorded disc in the other existing device, the other existing device cannot recognize the file system and thus determines that an unknown file system is used. Then, many of such existing devices may operate to instruct the user to format the disc (initialize the file system). According to the instruction, the user inadvertently formats the disc having video, audio, and information data recorded thereon, and the video, audio, and information data is erased.

SUMMARY OF THE INVENTION

A disc recording and reproducing device using a disc as a recording media comprises the following elements:
  a write inhibit flag readout and judging unit for reading out a write inhibit flag for protecting a recorded portion of the disc;
  a write inhibit flag writing unit for writing the write inhibit flag;
  a write inhibit flag memory for storing the write inhibit flag read out by the write inhibit flag readout and judging unit, when the disc is loaded;
  a first write-enable state setting unit for checking the write inhibit flag stored in the write inhibit flag memory when the disc is loaded, and for setting the write inhibit flag on the disc to a write-enable state when the write inhibit flag in the memory is in a write-protect state;
  a recording history information storage for storing a history of recording information on the disc; and
  a first write-protect state setting unit for checking information in the recording history information storage when the disc is unloaded, and for setting the write inhibit flag on the disc to the write-protect state when data is recorded on the disc or the write inhibit flag stored in the write inhibit flag memory is in the write-protect state and no data is recorded.

A disc recording and reproducing device using a disc as a recording media comprises the following elements:
  a write inhibit flag readout and judging unit for reading out a write inhibit flag for protecting a recorded portion of the disc;
  a write inhibit flag writing unit for writing the write inhibit flag;
  a write inhibit flag memory for storing the write inhibit flag read out by the write inhibit flag readout and judging unit, when the disc is loaded;
  a second write-enable state setting unit for checking a state of the write inhibit flag stored in the write inhibit flag memory when recording information onto the disc is started, and for setting the state of the write inhibit flag on the disc to a write-enable state when the write inhibit flag in the memory is in a write-protect state; and
  a second write-protect state setting unit for setting the state of the write inhibit flag on the disc to the write-protect state, when recording is stopped.

A disc recording and reproducing method using a disc as a recording media comprises:
  a step of reading out and judging a write inhibit flag for protecting a recorded portion of the disc;
  a step of writing the write inhibit flag;
  a step of storing the write inhibit flag read out by the write inhibit flag reading out and judging step into a memory, when the disc is loaded;
  a first write-enable state setting step of checking the write inhibit flag stored in the memory when the disc is loaded, and for setting the write inhibit flag on the disc to a write-enable state when the flag in the memory is in a write-protect state;
  a step of storing a history of recording information on the disc; and
  a first write-protect state setting step of checking information in the step of storing the history of recording information when the disc is unloaded, and for setting the write inhibit flag on the disc to the write-protect state when data is recorded on the disc or the write inhibit flag stored in the memory is in the write-protect state and no data is recorded.

A disc recording and reproducing method using a disc as a recording media comprises:
  a step of reading out and judging a write inhibit flag for protecting a recorded portion of the disc;
  a step of writing the write inhibit flag;
  a step of storing the write inhibit flag read out by the write inhibit flag reading out and judging step into a memory, when the disc is loaded;
  a second write-enable state setting step of checking a state of the write inhibit flag stored in the memory when recording information onto the disc is started, and setting the state of the write inhibit flag on the disc to a write-enable state when the flag in the memory is set to a write-protect state; and a second write-protect state setting step of setting the state of the write inhibit flag on the disc to the write-protect state, when recording is stopped.

DETAILED DESCRIPTION OF THE EXEMPLARY EMBODIMENTS

A recording and reproducing device is required to include a means of protecting information, such as video and audio data, for preventing the user from inadvertently erasing such information.

The present invention provides a recording and reproducing device and method that eliminate the need for a user thereof to know which file system the device uses to record data. Further, the device and the method automatically protect a disc having video, audio, and information data recorded thereon and using a new file system which other existing device cannot recognize so that the user does not erase the video, audio, or information data inadvertently.

A description is provided of exemplary embodiments of the present invention with reference to FIGS. 1 through 4.

First Exemplary Embodiment

Figure 1:
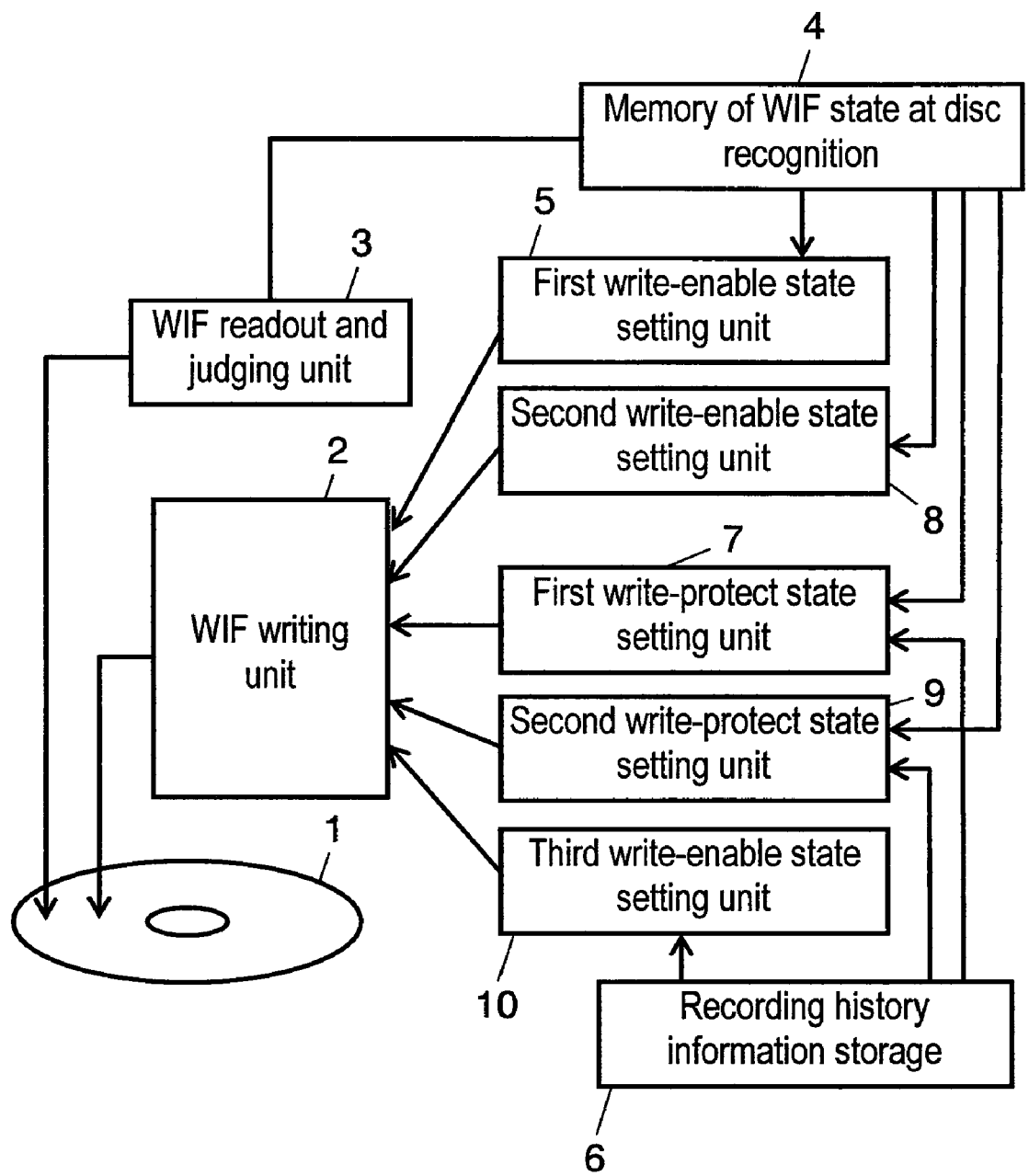
FIG. 1 is a block diagram showing a structure of a disc recording and reproducing device in accordance with a first exemplary embodiment of the present invention.

FIG. 1 is a block diagram showing a structure of a disc recording and reproducing device in accordance with the first exemplary embodiment of the present invention.

With reference to FIG. 1, the disc recording and reproducing device includes disc 1, WIF writing unit 2, WIF readout and judging unit 3, memory of WIF state at disc recognition 4, first write-enable state setting unit 5, recording history information storage 6, first write-protect state setting unit 7, second write-enable state setting unit 8, second write-protect state setting unit 9, and third write-enable state setting unit 10.

WIF writing unit 2 is an example of a write inhibit flag writing unit for writing a write inhibit flag. WIF readout and judging unit 3 is an example of a write inhibit flag readout and judging unit for reading out a write inhibit flag for protecting a recorded portion of disc 1. Memory of WIF state at disc recognition 4 is an example of a write inhibit flag memory for storing the write inhibit flag read out by the write inhibit flag readout and judging unit, when disc 1 is loaded.

Disc 1 is a detachable disc recording media, such as a DVD-RAM and DVD-RW. WIF writing unit 2 writes a WIF. The WIF refers to a write inhibit flag. For a DVD-RAM, a write inhibit flag in "Disc Identification" of the "Lead-in" is used. For a DVD-RW, "Disc Status" of "RMD" in "Recording Management Area" is used.

WIF readout and judging unit 3 reads and judges a WIF. The memory function of storing data in memory of WIF state at disc recognition 4 and recording history information storage 6 can be structured to store the data in a non-volatile memory so that the data is not lost at interruption of power supply.

In each of the exemplary embodiments of the present invention, the WIF is used as an example of write inhibit flags. The term "WIF" is used in each of the drawings. However, the write inhibit flag of the present invention is not limited to the WIF. The write inhibit flag of the present invention includes general information of write inhibit flags recorded in physical format. The WIF is an example of the write inhibit flags recorded in physical format.

Hereinafter, a description is provided of the operation of the disc recording and reproducing device as structured as above.

First, when disc 1 is loaded and recognized, WIF readout and judging unit 3 reads out and judges a WIF, i.e. a physical protection (protection by write-protect information in physical format), written on disc 1. The judging result, i.e. whether the WIF is in a write-protect state or write-enable state, is stored in memory of WIF state at disc recognition 4. When the judging shows that the WIF is in the write-protect state, first write-enable state setting unit 5 makes the WIF on disc 1 write-enable, via WIF writing unit 2. This operation enables recording thereafter.

The history of whether or not the recording operation is performed until disc 1 is unloaded is stored in recording history information storage 6. The recording operation in this case refers to all the operations of recording data onto disc 1. The recording operation includes recording and erasing video data, formatting, and finalizing.

Thereafter, when disc 1 is unloaded, the information in recording history information storage 6 is checked. When any recording operation is performed, or the WIF stored in memory of WIF state at disc recognition 4 is in the write-protect state even with no recording operation, first write-protect state setting unit 7 makes the WIF on disc 1 a write-protect state via WIF writing unit 2.

Thus, when no recording operation is performed on disc 1 from loading to unloading thereof, the WIF state of disc 1 unloaded is not changed from the state when the disc is loaded. In some cases, disc 1 having a WIF set to the write-protect state at unloading is loaded in other device that uses the same disc recording media but is incapable of recognizing a new file system. In such a case, the WIF specified in physical format causes write-protect operation. Thus, even when the other device cannot recognize the new file system, the device does not instruct the user to format the disc. As a result, the video data recorded on the disc is protected. Further, because these write-enable state and write-protect state of the WIF are set automatically, the user can use the disc without awareness of the states.

Second write-enable state setting unit 8 sets the WIF to the write-enable state not when the WIF is in the write-protect state at the recognition of disc 1, but when the start of recording operation is actually instructed. After the completion of recording, second write-protect state setting unit 9 sets the WIF to the write-protect state.

Thus, the write-enable state and write-protect state of the WIF can be set according to the actual operation.

Third write-enable state setting unit 10 operates to determine whether or not video data or the like is recorded on disc 1 when the disc is unloaded, and to set the WIF to the write-enable state when no data exists. Thus, when the disc contains no video data or the like to be protected, the disc recording and reproducing device operates to set the WIF to the write-enable state so that even other device can write data onto the disc.

Second Exemplary Embodiment

Figure 2:
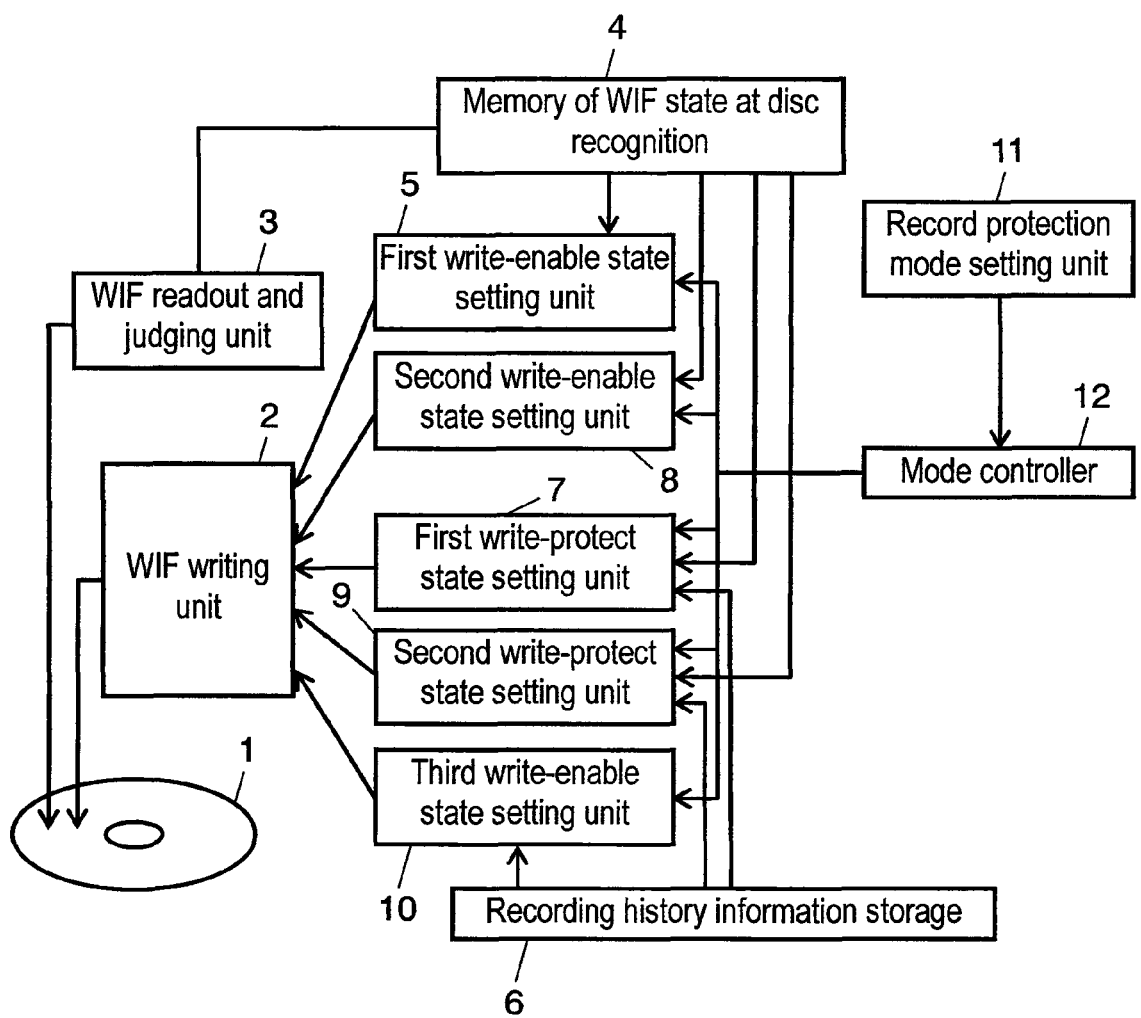
FIG. 2 is a block diagram showing a structure of a disc recording and reproducing device in accordance with a second exemplary embodiment of the present invention.

FIG. 2 is a block diagram showing a structure of a disc recording and reproducing device in accordance with the second exemplary embodiment of the present invention. In FIG. 2, elements similar to those in the first exemplary embodiment have the same reference marks and the descriptions of these elements are omitted.

The structure of FIG. 2 further includes record protection mode setting unit 11 and mode controller 12, in addition to the elements of FIG. 1. Record protection mode setting unit 11 allows the user to select one of an automatic record protection mode and an ordinary record protection mode. According to the record protection mode set by record protection mode setting unit 11, mode controller 12 controls a write-protect state and a write-enable state of a WIF, via first write-protect state setting unit 7, second write-protect state setting unit 9, first write-enable state setting unit 5, second write-enable state setting unit 8, and third write-enable state setting unit 10.

Figure 3:
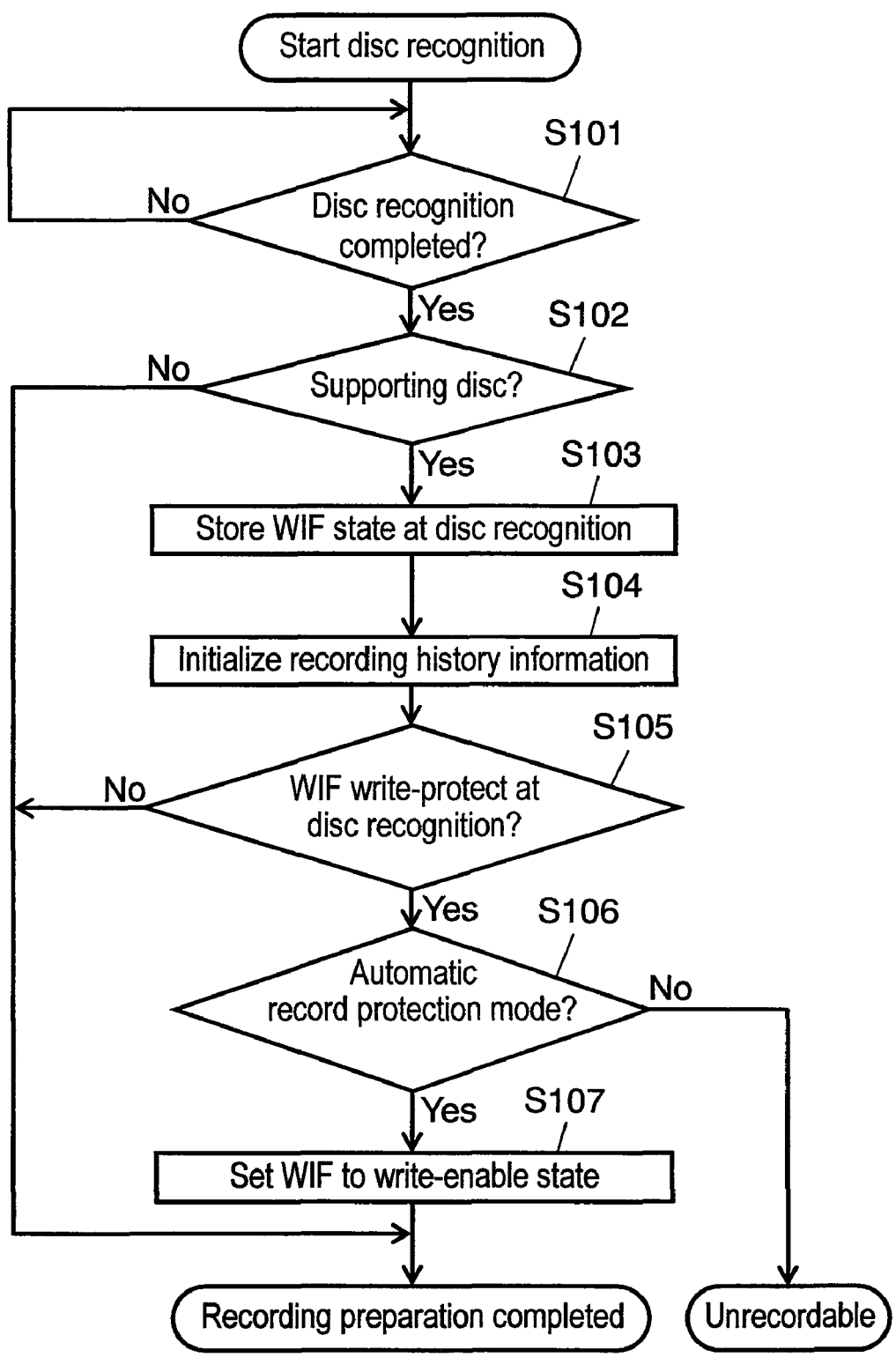
FIG. 3 is a flowchart showing the operation of the disc recording and reproducing device in accordance with the second exemplary embodiment according to recognition of a disc.
Figure 4:
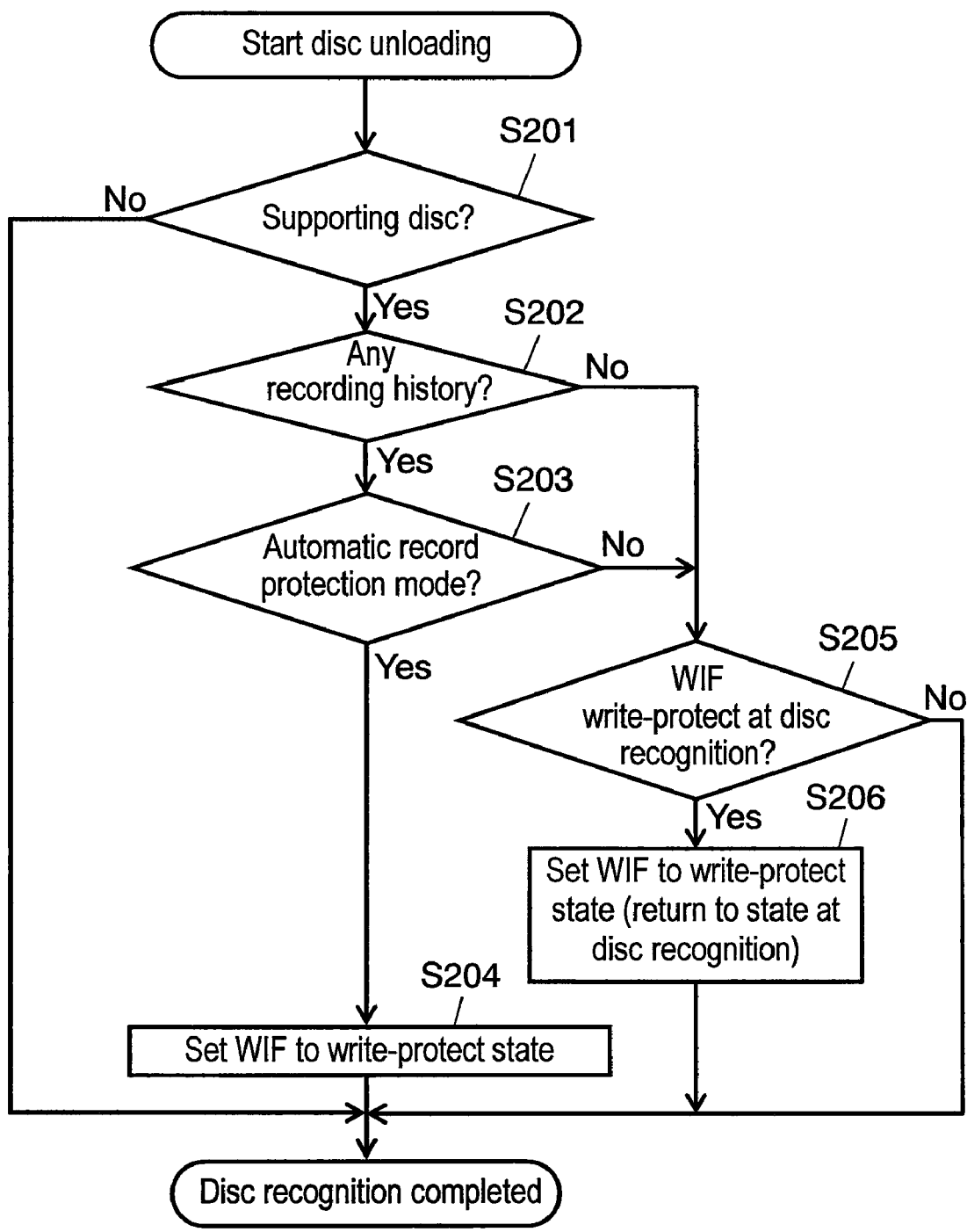
FIG. 4 is a flowchart showing the operation of the disc recording and reproducing device in accordance with the second exemplary embodiment during unloading of the disc.

FIG. 3 is a flowchart showing the operation of the disc recording and reproducing device in accordance with the second exemplary embodiment according to recognition of a disc. FIG. 4 is a flowchart showing the operation of the disc recording and reproducing device in accordance with the second exemplary embodiment during unloading of the disc. Hereinafter, descriptions are provided of the operations with reference to FIGS. 3 and 4.

With reference to FIG. 3, when disc 1 is loaded in the disc recording and reproducing device, the device starts recognition of the disc. In step S101, it is judged whether the recognition is completed or not. When the recognition is not completed, the disc recording and reproducing device waits for the completion of the recognition. After the completion of the disc recognition, the disc recording and reproducing device judges whether or not the disc supports WIF write-protect state/write-enable state control, through the WIF reading operation by WIF readout and judging unit 3, in step S102. Discs (recording media) in which the write-protect state and write-enable state of the recorded data protection is controlled in physical format, such as a DVD-RAM and DVD-RW, are handled as supporting discs (supporting media).

Next, when disc 1 is a supporting media, WIF readout and judging unit 3 reads out the WIF, and judges the state of the WIF. In step S103, the WIF state at disc recognition is stored in memory of WIF state at disc recognition 4. On the other hand, when disc 1 is not a supporting media, the disc recording and reproducing device completes the preparation of recording.

In step S104, the disc recording and reproducing device initializes recording history information storage 6 and starts the management of the recording history. Then, in step S105, it is judged whether or not the WIF at disc recognition is in the write-protect state. When the WIF is not in the write-protect state, the disc recording and reproducing device completes the preparation of recording. When the WIF is in the write-protect state, in step S106, it is judged whether or not the device is in the automatic record protection mode. When the device is in the automatic record protection mode, mode controller 12 controls first write-enable state setting unit 5 so that the WIF is automatically set to the write-enable state to enable recording, in step S107. When it is judged that it is not in the automatic record protection mode in step S106, the disc recording and reproducing device determines that disc 1 is unrecordable, and does not perform recording operation.

The automatic record protection mode determined in step S106 is a mode for operating first write-protect state setting unit 7, second write-protect state setting unit 9, first write-enable state setting unit 5, second write-enable state setting unit 8, and third write-enable state setting unit 10 for the WIF in accordance with the present invention. In the disc recording and reproducing device of the present invention, the user can select one of the automatic record protection mode and the ordinary record protection mode, using record protection mode setting unit 11 of FIG. 2. On the other hand, the ordinary record protection mode is a mode for operating a disc according to the physical specification recorded in physical format. In this mode, when the WIF is in the write-protect state, recording is inhibited. Thus, the write-protect state and write-enable state of the WIF is not controlled.

In the automatic record protection mode, after the WIF is automatically set to the write-enable state to enable recording as described above, recording history information storage 6 stores information on whether the recording operation is performed or not.

Next, a description is provided of the succeeding operation performed during unloading of disc 1, with reference to FIG. 4.

With reference to FIG. 4, the disc recording and reproducing device performs the operation of starting unloading the disc.

First, in step S201, the disc recording and reproducing device judges whether or not the disc is a supporting disc in a manner similar to disc recognition (step S102). When the disc is not a supporting disc, the disc recognition is completed. When the disc is a supporting disc, in step S202, the information in recording history information storage 6 is checked. When the checking result shows any recording has performed, control goes to step S203. When no recording has performed, control goes to step S205. When, in step S203, it is judged that the device is in the automatic record protection mode, control goes to step S204. When, in step S203, it is determined that the device is not in the automatic record protection mode, control goes to step S205. In step S204, mode controller 12 controls first write-protect state setting unit 7 so that the WIF is automatically set to the write-protect state. Thus, even when disc 1 is loaded in other existing device thereafter, the physical protection (protection specified in physical format) by the WIF disables erasing operation, such as formatting.

On the other hand, as described above, when, in step S202, it is judged that no recording has performed, i.e. when disc 1 is loaded and unloaded without data recording operation, control goes to step S205. When, in step S203, it is determined that the device is not in the automatic record protection mode, i.e. in the ordinary record protection mode, control goes to step S205. When, in step S205, it is determined that the WIF state at disc recognition is in the write-protect state, control goes to step S206. When the WIF state at disc recognition is not in the write-protect state, the disc recognition is completed. In step S206, the WIF is set to the write-protect state. In other words, the WIF state is returned to the state at disc recognition.

In the descriptions of the first and second exemplary embodiments, a disc is used as a recording media. The recording media is not limited to a disc, and can be a semiconductor memory card, such as an SD memory card.

As obvious from the descriptions of the first and second exemplary embodiments, the present invention allows other device using the same disc recording media but incapable of recognizing a new file system not to instruct the user to initialize the file system (format the disc). Thus, the write-protect state and write-enable state of the write inhibit flag on the disc can be controlled without the user's awareness.

In the present invention, a disc recording and reproducing device uses a disc recording media that is to be used in other device, and a new file system that cannot be recognized by the other device. The disc recording and reproducing device can automatically set the write inhibit flag, i.e. a physical protection of the disc, set to a write-protect state at loading to a write-enable state without the user's awareness, to unable recording. Then, automatically setting the write inhibit flag to the write-protect state when the disc is unloaded after the recording of video data can inhibit such operation as formatting in the other device without the user's awareness.

Further, in the present invention, the recording history information is checked when disc 1 is unloaded. Then, when data is recorded or the write inhibit flag stored in the write inhibit flag memory is in the write-protect state even without any data recorded, the write inhibit flag on the disc can be set to the write-protect state. Thus, when disc 1 is loaded but no operation is performed, the write inhibit flag on disc 1 can be returned to the state at loading.

Alternatively, in the present invention, the write inhibit flag can be set to the write-enable state for the first time at actual recording operation. In this setting, when disc 1 is loaded but no operation is performed, the state of the write inhibit flag can securely be kept. The state of the write inhibit flag can be kept even at interruption of power supply without the need of special control.

Further, in the present invention, the function like a conventional device can also be used at the user's selection. With this function, recording is inhibited when the write inhibit flag is set, and the write inhibit flag is automatically set after recording.

Further, on disc 1 unloaded after a device of the present invention has recorded data thereon once, the write inhibit flag is set to the write-protect state. Thus, even when the disc is attempted to be used in other device incapable of recognizing a new file system, only a device having a function of setting the write inhibit flag directly to the write-enable state can use the disc 1. For this reason, when disc 1 contains no video data to be protected thereon at unloading, the write inhibit flag can be set to the write-enable state. Thus, other existing device can use this disc 1.

The disc recording and reproducing device and method of the present invention can exert the above advantages and functions, and thus are useful for a camera recorder, DVD recorder, PC, and so on.

What is claimed is:

1. A disc recording and reproducing device using a disc as a recording media, the device comprising:
    a write inhibit flag readout and judging unit for reading out a write inhibit flag for protecting a recorded portion of the disc;
    a write inhibit flag writing unit for writing the write inhibit flag;
    a write inhibit flag memory for storing the write inhibit flag read out by the write inhibit flag readout and judging unit, when the disc is loaded;
    a first write-enable state setting unit for checking the write inhibit flag stored in the write inhibit flag memory when the disc is loaded, and for setting the write inhibit flag on the disc to a write-enable state when the write inhibit flag in the memory is in a write-protect state;
    a recording history information storage for storing a history of recording information on the disc; and
    a first write-protect state setting unit for checking information in the recording history information storage when the disc is unloaded, and for setting the write inhibit flag on the disc to the write-protect state when data is recorded on the disc or the write inhibit flag stored in the write inhibit flag memory is in the write-protect state and no data is recorded on the disc.

2. The disc recording and reproducing device of claim 1, further comprising:
    a record protection mode selection unit for selecting one of an automatic record protection mode and an ordinary record protection mode; and
    a mode controller for stopping control of the write inhibit flag taken by the first write-protect state setting unit and the first write-enable state setting unit, when the ordinary record protection mode is selected.

3. The disc recording and reproducing device of claim 1, further comprising a third write-enable state setting unit for checking information in the recording history information storage when the disc is unloaded, and setting the write inhibit flag to the write-enable state when no information is recorded on the disc.

4. A disc recording and reproducing device using a disc as a recording media, the device comprising:
    a write inhibit flag readout and judging unit for reading out a write inhibit flag for protecting a recorded portion of the disc;
    a write inhibit flag writing unit for writing the write inhibit flag;
    a write inhibit flag memory for storing the write inhibit flag read out by the write inhibit flag readout and judging unit, when the disc is loaded;
    a second write-enable state setting unit for checking a state of the write inhibit flag stored in the write inhibit flag memory when recording information onto the disc is started, and setting the state of the write inhibit flag on the disc to a write-enable state when the flag in the write inhibit flag memory is in a write-protect state; and
    a second write-protect state setting unit for setting the state of the write inhibit flag on the disc to the write-protect state, when recording is stopped.

5. The disc recording and reproducing device of claim 4, further comprising:
    a record protection mode selection unit for selecting one of an automatic record protection mode and an ordinary record protection mode; and
    a mode controller for stopping control of the write inhibit flag taken by the second write-protect state setting unit and the second write-enable state setting unit, when the ordinary record protection mode is selected.

6. The disc recording and reproducing device of claim 5, further comprising a third write-enable state setting unit for checking information in a recording history information storage when the disc is unloaded, and setting the write inhibit flag to the write-enable state when no information is recorded on the disc.

7. The disc recording and reproducing device of claim 2, further comprising a third write-enable state setting unit for checking information in the recording history information storage when the disc is unloaded, and setting the write inhibit flag to the write-enable state when no information is recorded on the disc.

8. A disc recording and reproducing method using a disc as a recording media, the method comprising:
    a step of reading out and judging a write inhibit flag for protecting a recorded portion of the disc;
    a step of writing the write inhibit flag;
    a step of storing the write inhibit flag read out by the write inhibit flag reading out and judging step into a memory, when the disc is loaded;

a first write-enable state setting step of checking the write inhibit flag stored in the memory when the disc is loaded, and for setting the write inhibit flag on the disc to a write-enable state when the flag in the memory is in a write-protect state;

a step of storing a history of recording information on the disc; and a first write-protect state setting step of checking information in the step of storing the history of recording information when the disc is unloaded, and for setting the write inhibit flag on the disc to the write-protect state, when data is recorded on the disc or the write inhibit flag stored in the memory is in the write-protect state and no data is recorded on the disc.

9. A disc recording and reproducing method using a disc as a recording media, the method comprising:

a step of reading out and judging a write inhibit flag for protecting a recorded portion of the disc;

a step of writing the write inhibit flag;

a step of storing the write inhibit flag read out by the write inhibit flag reading out and judging step into a memory, when the disc is loaded;

a second write-enable state setting step of checking a state of the write inhibit flag stored in the memory when recording information onto the disc is started, and setting the state of the write inhibit flag on the disc to a write-enable state when the flag in the memory is in a write-protect state; and a second write-protect state setting step of setting the state of the write inhibit flag on the disc to the write-protect state, when recording is stopped.

* * * * *